No. 882,430.  
PATENTED MAR. 17, 1908.  
P. SICOTTE.  
FASTENER.  
APPLICATION FILED JULY 2, 1907.

WITNESSES  
E. G. Bromley  
John K. Brackwogel

INVENTOR  
Pierre Sicotte  
BY Munn & Co.  
ATTORNEYS

UNITED STATES PATENT OFFICE.

PIERRE SICOTTE, OF LANSING, KANSAS.

FASTENER.

No. 882,430.   Specification of Letters Patent.   Patented March 17, 1908.

Application filed July 2, 1907. Serial No. 381,854.

*To all whom it may concern:*

Be it known that I, PIERRE SICOTTE, a citizen of the United States, and a resident of Lansing, in the county of Leavenworth and State of Kansas, have invented a new and Improved Fastener, of which the following is a full, clear, and exact description.

This invention relates to fasteners and more particularly to fasteners for joining different parts of articles of furniture such as tables, chairs, dressers and the like.

The object of the invention is to provide a simple, strong and inexpensive fastener which takes the place of screws or hanger bolts and which can be applied or released with ease and rapidity.

A further object of the invention is to provide a device of the class described by means of which the different parts can be securely joined together and which firmly holds the parts against relative movement.

The invention consists in the construction and combination of parts to be more particularly described hereinafter and fully pointed out in the claims.

Figure 1:
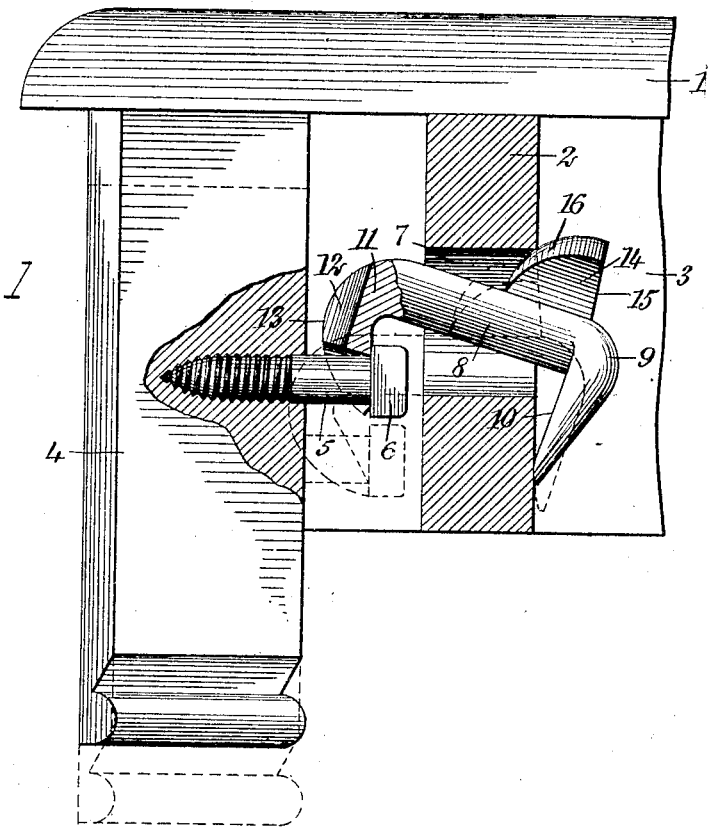
Figure 2:
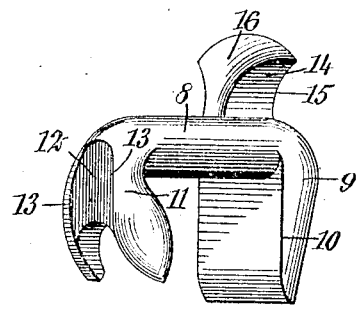

Reference is to be had to the accompanying drawings forming a part of this specification, in which similar characters of reference indicate corresponding parts in all the views, and in which Figure 1 represents a part of a table with my invention applied thereto and having parts broken away and showing parts in cross-section; and Fig. 2 is a perspective view of the fastener.

Before proceeding to a more detailed explanation of my invention, it should be understood that the primary purpose of the same is to provide means for firmly securing the different parts of articles of furniture in their proper relative positions. However, the fastener can be used for joining parts of various articles and devices and is not adapted to exclusive use in connection with articles of furniture. As an example, it may be applied as a fastener for packing cases, in various forms of carpentry, and in cabinet making. In using my fastener, the parts to be joined can be secured together rapidly and with but little labor. Furthermore, the use of extra bolts or screws can be dispensed with and no tools such as a screw-driver or a wrench are requisite. Nearly all articles of furniture such as tables and chairs are manufactured in knocked-down form; that is, the legs are not attached to the bodies until the article is received by the retailer or individual purchaser. With many of the fasteners now in use considerable time and labor are necessary in attaching the legs to the bodies and it is the purpose of my invention to avoid this loss of time and this extra work. The device is shown as used in connection with a support such as the corner-block of a table, and in this application the fastener serves as a lateral support or retainer for the latter, which prevents the loosening of the latter.

Referring more particularly to the drawings, 1 represents a table body having at each corner a support or corner-block 2, joining the adjacent sides. Near each corner the table has a leg 4 of common or preferred form, mounted near the intersection of the adjacent table sides 3. The leg 2 at opposite sides seats against the edges of the table sides 3. The leg 4 has a lag-screw 5 projecting inwardly between the sides of the table toward the corner-block 2 and provided with the usual head 6. The corner-block is provided with an opening 7 therethrough, preferably circular in cross-section and having its lower edge adjacent to the screw 5.

My fastener is preferably fashioned of suitable metal such as steel, iron or brass, and comprises a shank 8 having at one end a laterally disposed head 9 having a flat inner face 10. The head 9 is preferably integral with the shank of the fastener. At the end opposite to the head 9 the shank has an integral claw 11, disposed in the same direction as the head 9 and having at the outer face a groove 12, arranged transversely of the length of the shank and forming at the sides of the claw, runners 13. The claw 11 and the head 9 are disposed toward each other and are mutually inclined as is shown most clearly in Fig. 1. Integral with the shank 8 and at the side thereof opposite to the head and the claw, is a wing 14 presenting a substantially flat shoulder 15 at the side adjacent to the head 9 and having a rounded face 16 at the opposite side.

The fastener is used in connection with the corner-block 2, and is arranged in the opening 7 with the claw adjacent to the table-leg and the head engaging the face of the corner-block at the side remote from the leg. When the fastener is in position the leg is placed as shown in dotted outline in Fig. 1, with the bolt engaging the claw, the latter passing over the bolt and coming into contact with the under side of the head 6 of the lag-screw. The leg is then forced home and in moving into position swings the fastener about the end of the head as a pivotal point, whereby the latter is forced toward the corner-block and jammed into position, abutting against the edges of the table sides, owing to the fact that as the fastener is swung about the end of the head the arc of the swing brings the claw nearer to the corner-block, the latter tending to draw with it the bolt and the leg, owing to its engagement with the head of the lag-screw. When it is desired to release the fastener, the wing 14 is struck on the shoulder 15 by means of a hammer or any other suitable implement, and thereby the fastener is pivoted about the end of the head and the leg is thereby released, moving downwardly with the swing of the fastener. The downward movement of the claw end of the fastener is assisted by the engagement of the curved face 16 with the edge of the opening 7, the face 16 directing the movement of the fastener. With the pivotal movement of the fastener, the claw of the same moves toward the table-leg and frees the latter from its binding contact with the edges of the table sides, so that the leg can be easily withdrawn.

The claw of the fastener is grooved to form the runners 13, in order to decrease the surface of the claw liable to come in contact with the table leg, and thereby to facilitate the movement of the fastener in mounting the parts, and permit the runners 13 to assume positions at each side of the edge of the table-leg when the latter is arranged with an edge adjacent to the claw.

Having thus described my invention I claim as new, and desire to secure by Letters Patent:—

1. A fastener, comprising a shank having at one end a laterally disposed head, at the opposite end a laterally disposed claw, and on the side opposite to said head and said claw, a wing presenting a shoulder.

2. A fastener comprising a shank having at one end a laterally disposed head and at the other end a claw laterally disposed in the same direction, said claw and said head being mutually inclined.

3. A fastener comprising a shank having at one end a laterally disposed head and at the opposite end a laterally disposed claw, said claw and said head being located at the same side of the shank and being mutually inclined, said shank further having at the side opposite to said head and said claw a wing presenting a shoulder.

4. A fastener comprising a shank, a laterally disposed head integral with said shank and arranged at one end thereof, and a laterally disposed claw integral with said shank and at the end thereof opposite to said head, said head and said claw being inclined toward said shank, said shank having at the side opposite to said head and said claw a wing presenting a shoulder at the side adjacent to said head, and a curved face at the side opposite to said head, said claw having at the outer face a groove arranged transversely of the length of said shank.

5. The combination, with an article of furniture having a support and a part provided with a lag screw, of a fastener having a shank, a head, and a claw, said head being laterally disposed and adapted to engage the support at a point remote from said shank, said claw being adapted to engage the screw, said head acting as a fulcrum for the fastener whereby the same is swung about said head to force the part toward the support when the part is driven home.

6. The combination, with an article of furniture having a support and a part provided with a lag screw, of a fastener having a shank, a head and a claw, said head and said claw being laterally disposed at the same side of said shank and being mutually inclined, said shank carrying at the side opposite to said head and said claw a wing presenting a shoulder and a curved face, said head being adapted to engage the support at a point remote from said shank to serve as a pivot for the fastener, said claw being adapted to engage the lag screw, said head acting as a fulcrum for the fastener and permitting the same to be swung about said head to force the part toward the support when the part is driven home.

7. The combination, with an article of furniture having a support and a part provided with a lag screw, of a fastener adapted to engage the support, and having a claw adapted to engage the lag screw, said claw being laterally disposed and inclined toward the end of said fastener remote from said claw.

8. The combination, with an article of furniture having a support and a part provided with a lag screw, of a fastener having a head adapted to engage the support, and a claw adapted to clamp the lag screw, said head and said claw being laterally disposed and mutually inclined, said shank having a wing presenting a curved face adapted to engage the support.

9. The combination, with an article of furniture having a support presenting an opening therethrough and a part provided with a lag screw, of a fastener adapted to be arranged in said opening and having a head adapted to engage the support at one side thereof, and a claw adapted to engage the lag screw, said head and said claw being laterally disposed and mutually inclined, said fastener having a wing presenting a curved edge adapted to engage at an edge of the opening of the support.

In witness whereof I have signed my name to this specification in the presence of two subscribing witnesses.

PIERRE SICOTTE.

Witnesses:
 RICHARD O. EAGLE,
 W. A. MORGAN.